US006943565B2

(12) United States Patent
Pettersson et al.

(10) Patent No.: US 6,943,565 B2
(45) Date of Patent: *Sep. 13, 2005

(54) ANGULAR POSITION MEASURING EQUIPMENT IN ROBOTICS, WHERE IT DETERMINES THE ANGLE OF THE JOINTS

(75) Inventors: Bo Pettersson, Torshalla (SE); Carl-Erik Gustafsson, Eskilstuna (SE)

(73) Assignee: C E Johansson AB, Eskilstuna (SE)

( * ) Notice: Subject to any disclaimer, the term of this patent is extended or adjusted under 35 U.S.C. 154(b) by 83 days.

This patent is subject to a terminal disclaimer.

(21) Appl. No.: 10/363,403

(22) PCT Filed: Aug. 20, 2001

(86) PCT No.: PCT/SE01/01774

§ 371 (c)(1), (2), (4) Date: Jun. 23, 2003

(87) PCT Pub. No.: WO02/20227

PCT Pub. Date: Mar. 14, 2002

(65) Prior Publication Data

US 2004/0027139 A1 Feb. 12, 2004

(30) Foreign Application Priority Data

Sep. 4, 2000 (SE) .......................... 0003111-2

(51) Int. Cl.$^7$ ............................. G01R 27/26
(52) U.S. Cl. ................. 324/661; 324/207.25; 901/9
(58) Field of Search ................ 324/207.13, 207.22, 324/207.25, 632, 661; 901/9

(56) References Cited

U.S. PATENT DOCUMENTS

| 4,604,575 A | 8/1986 | Shimizu et al. ........ 324/207.18 |
| 4,839,646 A | 6/1989 | Tyson ..................... 340/870.3 |
| 4,870,358 A | 9/1989 | Glaize et al. .......... 324/207.22 |
| 5,763,976 A | 6/1998 | Huard ....................... 310/168 |
| 6,717,312 B1 * | 4/2004 | Kaplan et al. ................ 310/91 |
| 2004/0046548 A1 * | 3/2004 | Pettersson et al. ..... 324/207.17 |

FOREIGN PATENT DOCUMENTS

GB   2 118 720 A   11/1983

* cited by examiner

Primary Examiner—Vincent Q. Nguyen
Assistant Examiner—Walter Benson
(74) Attorney, Agent, or Firm—Young & Thompson

(57) ABSTRACT

A robot arm for industrial robots comprises one or several jointed arms (1,1c) that are mutually connected to each other by means of rotary joints (1a, 1b), and a jointed arm (1) connected to a base (3), in which an angle transducer is arranged in the rotary joints (1a,1b) in order to measure exactly the angular relationship between the jointed arms (1,1c) or between the jointed arm (1) and the base (3), in order to make possible adjustment of the robot arm into the desired angular position.

11 Claims, 5 Drawing Sheets

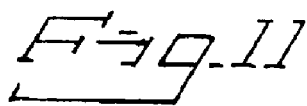
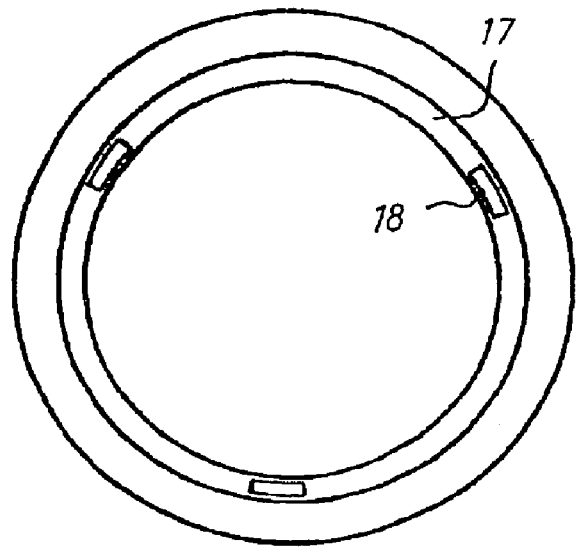
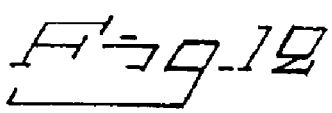
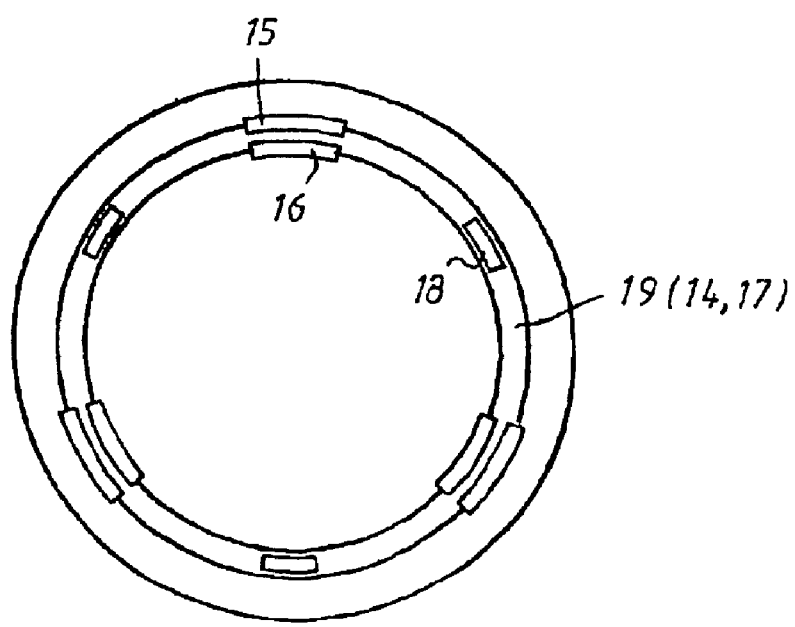

ANGULAR POSITION MEASURING EQUIPMENT IN ROBOTICS, WHERE IT DETERMINES THE ANGLE OF THE JOINTS

FIELD OF THE INVENTION

The present invention relates to a robot arm for industrial robots, and to be more specific, it relates to a precise regulation of an angular relationship in one or several joints in the robot arm.

BACKGROUND OF THE INVENTION

There are currently no suitable arrangements for adjustment of robot arms in order to be able, through exact measurement of the angular relationship in one or several of the joints of the robot arm, to make an exact adjustment of the outer end of the robot arm, that is, its working point. It has instead been necessary to depend on being able to control the gear or other driving system that achieves turning of the joint, based on a defined initial condition, such that the working point adopts the desired position. There is no possibility of verifying the setting at a particular joint.

OBJECT OF THE INVENTION

The aim of the present invention, therefore, is to achieve a robot arm in which it is possible to measure exactly the angular relationship in one or several joints of the robot arm in order to be able to make an exact adjustment of its working point, and to be able to verify the angular relationship in a particular joint.

SUMMARY OF THE INVENTION

The above aim is achieved with a robot arm for industrial robots, comprising one or several jointed arms that are mutually connected to each other by means of rotary joints, and a jointed arm connected to a base, where an angle transducer is arranged in the rotary joint in order to measure exactly the angular relationship between the jointed arms or between the jointed arm and the base, in order to make possible adjustment of the robot arm into the desired angular position.

According to claim 2, the angle transducer comprises a first disk, the rotor, with circularly arranged and radially directed receiver electrodes and a second disk, the stator, equipped with circularly arranged and radially directed transmitter electrodes arranged at the same radius as the receiver electrodes and with a fixed separation between the receiver electrodes and the transmitter electrodes on the two disks, whereby the disks are arranged coaxially and rotatable relative to each other, and the disks are further separated by a thin air-gap that makes possible a capacitive or an inductive coupling between the electrode systems on the receiver disk and the transmitter disk, whereby the transmitter electrodes are each supplied with an alternating voltage with different phases for neighbouring electrodes, whereby the number of supply phases, $\Phi$, is greater than two, and the separation of transmitter electrodes=the separation of receiver electrodes/$\Phi$, and where the transmitter electrodes of the stator are geometrically arranged such that errors in their geometry relative to the geometry of the receiver electrodes produces equal but opposite error signals in the receiver electrodes of the rotor.

An angle transducer of the type described above is the subject of a separate patent application that is being submitted simultaneously with the present one, and a description of current angle transducers and the problems that are associated with them is presented in the separate application, as is a more detailed description of the theory behind these angle transducers.

BRIEF DESCRIPTION OF THE DRAWINGS

The invention will now be described with the aid of a non-limiting embodiment, illustrated in the attached drawings, in which FIG. 11 shows additional electrodes in order to check angular deviation (axial movement, wobble) relative to the centre of rotation in the joints of the robot arm, FIG. 12 shows an improved arrangement of the electrodes in FIG. 10 and FIG. 11.

DETAILED DESCRIPTION OF THE INVENTION

Figure 1:
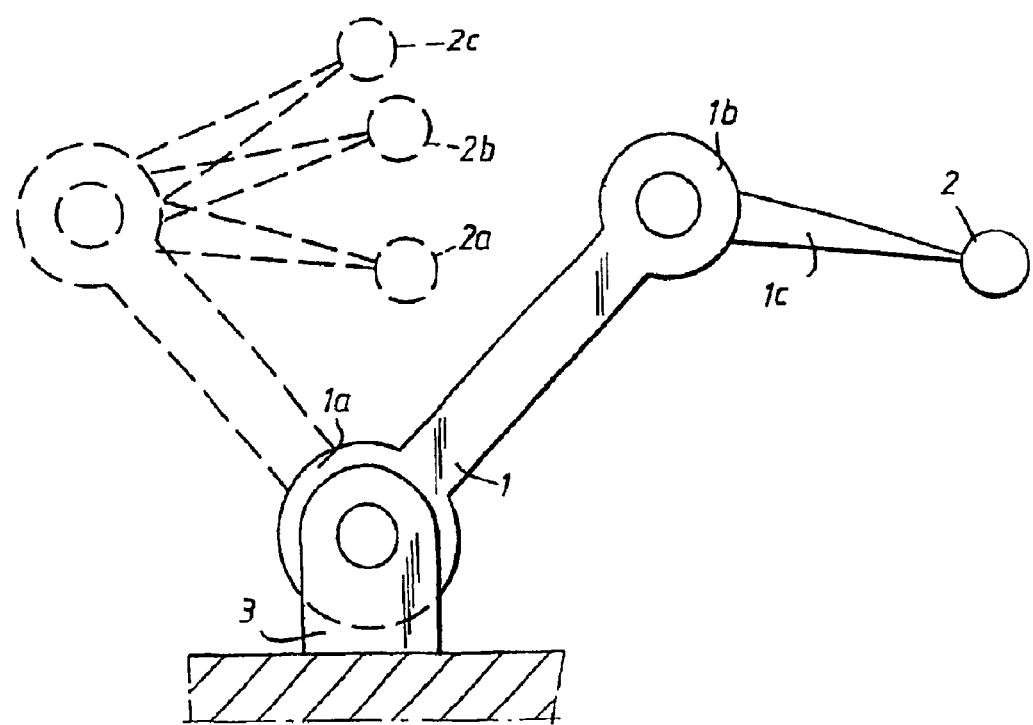
FIG. 1 shows a sketch of the principle of a robot arm with different setting positions.

Thus FIG. 1 shows a robot arm for, for example, an industrial robot. Angle transducers are built into the rotary joints 1a and 1b of the robot arm 1. This gives the advantage that the angles are read directly and no distortion of the value occurs through, for example, periodic errors in gear-boxes. The outer end 2 of the robot arm can be equipped with, for example, a robot grip claw. In this description, we have chosen to denote the end 2 as "the working point" of the system. The robot arm 1 is attached to the support by means of a stationary base 3.

The working point 2 can adopt freely chosen positions 2, 2a, 2b, 2c, etc., through different angles of the rotary joints. In the case shown in FIG. 1, these positions lie solely in the plane of the paper. The working point 2 can adopt a freely chosen position in a three-dimensional system by adding further rotary joints.

Figure 2:
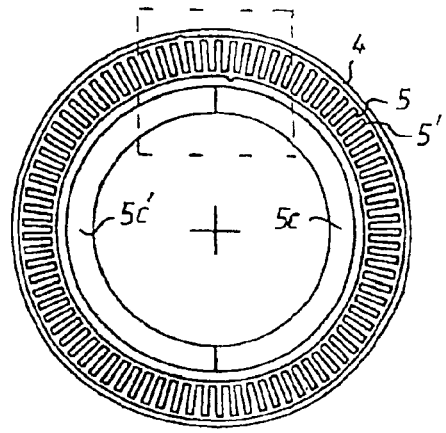
FIG. 2 shows an example of a complete rotor disk for an angle transducer in a robot arm according to the invention.

A complete rotor disk 4 for use in an angular transducer for a robot arm according to the invention is shown in FIG. 2.

One of the properties of capacitive measurement systems designed according to the Swedish patent 7714010-1 is that of directly and with high precision being able to determine the magnitude of a relative angular rotation that is less than the separation of the receiver electrodes, which in the example below is ⅛₁ parts of a revolution. On the other hand, no information is obtained about which of the receiver electrode separations (in the example this is which of the 81 possible separations) is the current one. The transducer is, therefore, equipped with a second angular measurement system with a receiver electrode separation of 360°, i.e. one complete revolution. This second system, known as the "coarse measurement system" only serves to determine which of the 81 receiver electrode separations in the example is the current one.

Figure 4:
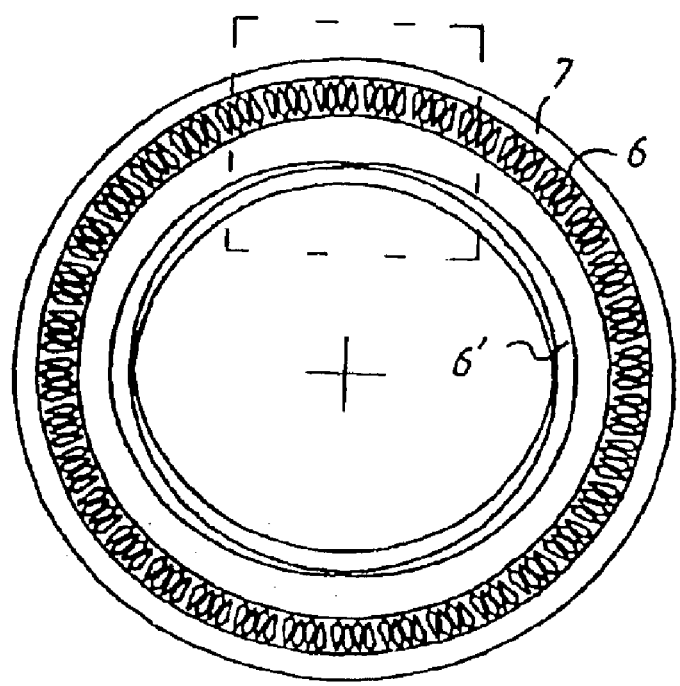
FIG. 4 shows an example of a complete stator disk according to the invention, without means of measuring play.
Figure 5:
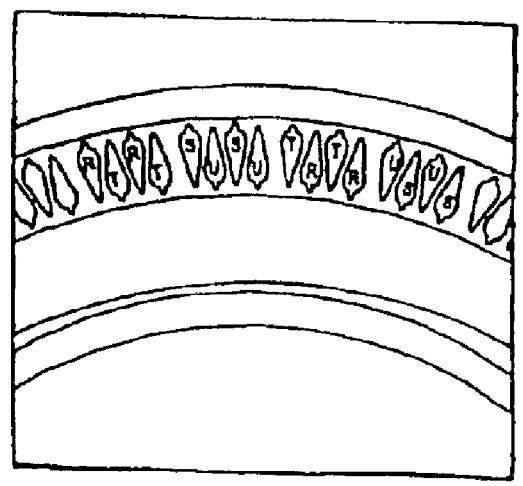
FIG. 5 shows a magnified section of FIG. 4.

FIG. 2 shows the rotor disk 4, the receiver electrodes 5 and 5' and the inner receiver electrodes 5c and 5c' intended to receive signals from the coarse measurement system (FIGS. 4 and 5).

Figure 3:
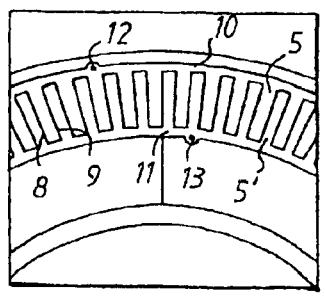
FIG. 3 shows a magnified section of FIG. 2.

The outer receiver electrodes 5 and 5' thus form together with the corresponding electrodes 6 on the stator disk 7, the high-resolution angular measurement system, while the inner receiver electrodes 5c and 5c' form, together with the corresponding electrodes 6' on the stator disk 7, the coarse measurement system, which determines the angular position within the revolution of 360°. FIG. 3 shows a section of the rotor disk at a higher scale.

The disk is coated with a conducting coating that is preferably constituted by a thin rolled copper foil. The black lines show insulating lines that can be achieved by means of, for example, photolithographic etching.

The lines 8, 9 in FIG. 3, which form the polar lines of limitation for the receiver electrodes, are directed towards a centre that is common for all circular and polar elements that are present on the disk. The width of the electrodes is, therefore, preferably chosen such that the width of the electrodes is equal in size to the spacing between the electrodes. As FIG. 2 makes clear, and as can be seen in more detail in FIG. 3, a preferably thin strip 21 of conducting material is left behind above the upper limit of the electrodes 5. In this way, all electrodes 5 on the rotor disk will be in electrical contact in the form of parallel connection, which means that the very weak signal strength that is received in an individual rotor electrode is multiplied by a factor that principally depends of the number of rotor electrodes on the disk 4.

In one possible embodiment, the angular separation between the rotor electrodes can be chosen such that 81 electrodes are present around one complete revolution, 360°.

In order to increase further the strength of the signal received, and, in particular, with the aim of reducing the sensitivity of the transducer for external sources of disturbance that produce alternating electrical fields that can be collected by the electrodes 5 of the rotor disk, the rotor disk is equipped with a second system of rotor electrodes 5', FIGS. 2 and 3. The second set of electrodes 5' is created by the same line of electrical insulation as forms the first set of electrodes 5, and since the width of the electrodes has been preferably chosen such that the width of the electrodes is equal to the size of the spacing between electrodes, the shape, area and width of the second set of electrodes 5' will be identical to those of the first set of electrodes 5.

This second set of electrodes 5' is also in electrical connection in the same way as the first set of, electrodes 5 through a thin strip of conducting material 11 being left behind below the electrodes.

In one preferred embodiment, the signals produced in the electrode fields 5 and 5' are transferred via through-plated holes 12 and 13, FIG. 3, to arrangements present on the reverse side of the disk in order to be connected to electronic circuits for signal processing, such as a differential amplifier.

Four supply signals R,S,T,U are used in the preferred system that is described here. These are displaced in phase relative to each other according to the Swedish patent 7714010-1 as so shown in the following pattern:

| Supply Signal | R | S | T | U |
|---|---|---|---|---|
| Phase position, degrees | 0° | 90° | 180° | 270° |

The table shows that the supply signals R and T are displaced in phase relative to each other by 180°. In the same way, the supply signals S and U are displaced in phase relative to each other by 180°.

Figure 6:
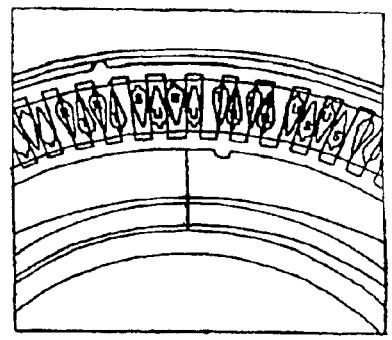
FIG. 6 shows the interaction between the stator and the rotor electrodes.

FIG. 6 is intended to explain the formation of differential signals in the sets of electrodes 5 and 5' on the rotor disk. Both the rotor disk and the stator, disk are shown as "X-ray" images in FIG. 6, in the position in which they are located in an assembled angle transducer. The rotor disk 4 with the arrays 5 and 5' of receiving arrays of rotor electrodes is thus shown with thin lines, while the stator disk 7, which is equipped with the "transmitting" heart-shaped stator electrodes R,S,T,U, is shown with thicker lines. The differential signal geometry can be most simply seen from the electrodes in FIG. 6 that are supplied with alternating voltage with the phases S and U.

FIG. 6 shows that at a certain position, all stator (transmitter) electrodes with phase S are located directly above the rotor electrodes 5 that are directed inwards towards the centre. At the same time, all stator electrodes with phase U are located directly above the rotor electrodes 5' that are directed outwards.

Figure 7:
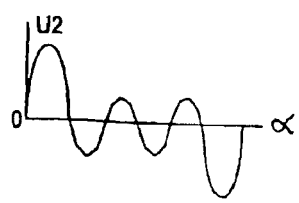
FIG. 7 shows an example of a possible appearance of signals in the two differential receiver electrode fields 5 and 5'.
Figure 7:
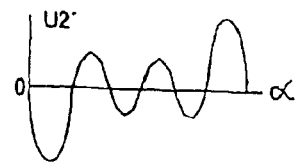

As has been described above, the two sets of rotor electrodes are displaced geometrically by ½ off a rotor electrode separation relative to each other. Since the transmitter electrodes S and U are supplied with voltages that are equal in magnitude and displaced in phase by 180° relative to each other, the signals received in the rotor electrodes 5 and 5' will be equal in magnitude but of opposite sign. This is illustrated in principle in FIG. 7. The two diagrams show how the amplitude U of the signal received by the receiver electrodes 5 and 5' of the rotor varies with a relative change of angle α between the rotor and the stator.

The upper diagram shows in principle the amplitude of the signal that is produced in the rotor electrodes 5, while the lower diagram shows the equivalent for the signal that is produced in the rotor electrodes 5'. As the diagram makes clear, the signals that are received from the set 5' of electrodes constitute a mirror image of the signal in the set 5 of electrodes. This means that it is highly appropriate to apply the two signals each to one input of a differential amplifier as has been mentioned above. In this way, the effect is achieved that the two signals are added, and the resulting output signal from the amplifier has an amplitude that is twice as large. Furthermore, the influence of disturbing signals produced in the receiver electrodes 5 and 5' due to external electrical alternating fields is in this way reduced using the property of the differential amplifier that depresses signals on its inputs that have the same phase (Common Mode Rejection).

When using robot arm systems containing one or several linked arms, 1, 1c in FIG. 1, heavy demands are placed when using traditional types of angle transducer on the bearings of the arms if the precision of the system at its working point 2 is to be maintained. Poor precision in the bearings can lead to stochastic tilts of the type shown in FIG. 8, or to radial displacements according to FIG. 9. This leads to the working point 2 of the jointed arm system 1 being subject to a cosine error depending on the tilt illustrated in FIG. 8 and/or the radial and axial displacement illustrated in FIG. 9.

Figure 8:
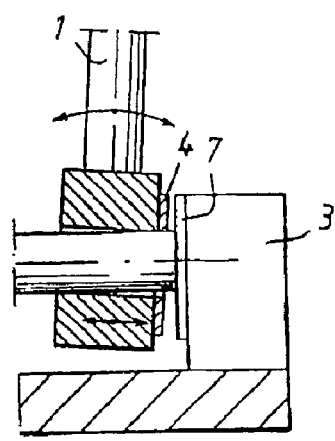
FIG. 8 shows a detail when the robot arm of FIG. 1 is subject to tilt.
Figure 9:
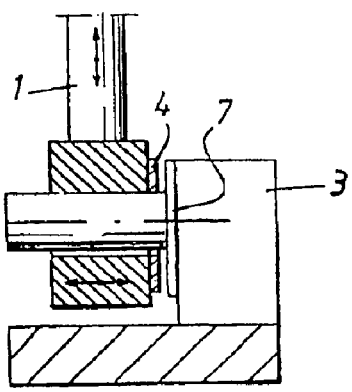
FIG. 9 shows radial displacement of the robot arm according to FIG. 1.

When using the invention described here, however, the effects of tilts of the rotor 4 relative to the stator 7, FIG. 4, or of purely radial displacements of the rotor relative to the stator, FIG. 9, are compensated and eliminated, with respect to the angle of rotation that is read off directly through the special design of the pattern of electrodes 5 and 6 in FIG. 9. It is also a characteristic of the first part of the invention that cosine errors or radial displacements of the electrode systems can be neglected. However, when applied in a real system according to the example in FIG. 11 the influence on the working point 2 of the system 3 must also be considered. For complete control of the motion of the system at its working point 2, the system must also collect information concerning stochastic angular errors of the type shown in FIG. 8 and stochastic radial displacements according to FIG. 9, together with stochastic axial displacements according to FIGS. 8 and 9. These phenomena are usually denoted by one common term: "play".

Figure 10:
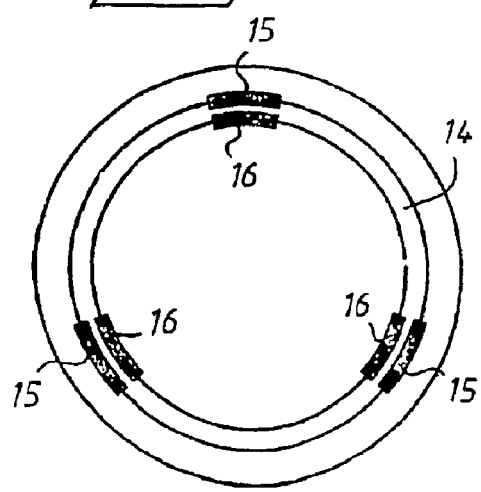
FIG. 10 shows additional electrodes in order to check radial deviation (wobble) from the centre of rotation in the joints of the robot arm.
Figure 10A:
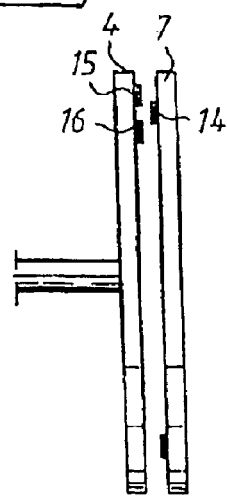
FIG. 10a shows a side view of the electrodes according to FIG. 10.

According to the invention, the electrode systems can be supplemented by one further system, FIGS. 10 and 10a. A circular transmitter electrode 14 is located on the stator disk 7. Receiver electrodes 15 and 16 are located on the rotor disk 4, and collect a signal from the transmitter electrode 14 by capacitive transmission. The amplitude of the signal received at 15 and 16 depends on the relative positions between $^{15}/_{16}$ and the transmitter electrode 14. The amplitudes in the electrodes 15 and 16 will be equally large in the symmetrical case. In the event of displacement from the symmetrical position, the amplitude will increase in one of the electrodes 15, 16 and decrease in the other.

By placing at least three pairs of electrodes 15, 16 equally spaced around the perimeter of the angle transducer, the radial displacement of the jointed arm 1 can be calculated with the aid of suitable mathematical processing of the amplitude values from the electrodes 15 and 16.

In order to determine an erroneous angle setting according to is FIG. 8, the electrode systems are supplemented by a further system, FIG. 11. A circular transmitter electrode 17 is located on the stator disk 7. At least three receiver electrodes 18 are located on the rotor disk 4 evenly distributed around the perimeter of the angle transducer. The radial extent of the electrodes 18 is less than the radial extent of the electrode 17 with the intention that the, capacitive coupling of the electrode 18 with the electrode 17 is to remain uninfluenced at all possible radial displacements.

The receiver electrodes 18 each collect a signal from the transmitter electrode 17 by capacitive transmission. The amplitude of the signal received at the electrodes 18 depends on the relative distance between 18 and the transmitter electrode 17. The amplitudes in all electrodes 18 will be equally large in the symmetrical case. In the event of tilt of the jointed arm 1 according to FIG. 8, the signal amplitude at each electrode 18 will depend on the magnitude and direction of the error. The angular error and the axial displacement of the jointed arm 1 can be calculated with the aid of appropriate mathematical processing of the amplitude values from the electrodes 18.

FIG. 12 shows one preferred embodiment, The transmitter electrodes 14 and 17 are located at the same radius in the preferred embodiment, and are constituted by one and the same electrode 19. The receiver electrodes 15, 16 and 18, are preferably located such that every second position around the perimeter of the angle-transducer is occupied by an electrode group 15, 16 and every second position by an electrode 18. This arrangement minimises the use of space in the radial direction.

In the case in which the radial space is of minor significance, it is an alterative to make the transmitter electrode 19 sufficiently broad that the electrodes 15, 16 and 18 can be distributed independently of each other around the perimeter of the angle transducer.

The transmitter electrodes for a capacitive system of the principle described here, 4-phase, must satisfy the condition that the separation between these electrodes must be equal to (the separation of the rotor (receiver) electrodes)/(Φ, i.e. in this case it must be equal to (the separation of the rotor (receiver) electrodes)/4. This means in the example that the separation of the transmitter electrodes must be $^{1}/_{81}*^{1}/_{4}$, i.e. $^{1}/_{324}$ parts of a revolution.

Thus, by permutation of the phase supply electrodes of the stator as is described in the second patent application submitted simultaneously, PCT/SE01/01773, the primary functional separation of ¼ of a rotor electrode separation between subsequent phase supply electrodes, R,S,T,U is maintained.

This is illustrated in FIG. 6 in which, in the position shown, transmitter electrode R is located halfway over a receiver electrode 5' and halfway over a receiver electrode 5. Transmitter electrode s is located directly over a receiver electrode 5 and is in this way displaced in function by ¼ of the separation of the receiver electrodes relative to electrode R. The next electrode, T, is located halfway over a receiver electrode 5 and halfway over a receiver electrode 5', and is thus displaced by ½ of the separation of the receiver electrodes relative to the electrode R and by ¼ of the separation of the receiver electrodes relative to the electrode S. It can be demonstrated in this way that all electrodes are still functionally distributed with a separation that is ¼ of the separation of the receiver electrodes relative to one of the receiver electrodes.

Although the angle transducer for the robot arm eliminates errors in specification of angles that arise from shortcomings in the bearings of the machine element onto which the transducer is mounted, positioning accuracy is still influenced mechanically and geometrically in the overall system by play and wobble in its bearings. Even if the angular position has been correctly read by the angular measurement system, the position of the working point 2, FIG. 1, is influenced by play or displacements of the type shown in FIGS. 8 and 9.

Such errors can also be measured and compensated for in real-time by adding a further electrode system. Such electrode systems are shown in FIGS. 10, 11 and 12, where FIGS. 10 and 11 individually demonstrate how radial wobble and axial displacement are measured, respectively. FIG. 12 shows how these two systems can be combined into one common system.

The fact that the output signals from each individual plate 15, 16 in FIGS. 10 and 12 are connected to an electronic unit should be added to the original description of this function. The electronic unit can instantaneously determine the magnitude and direction of any radial wobble present by measuring the amplitudes present at the six plates 15, 16.

Each individual plate 18 in FIGS. 11 and 12 is, in the same way, connected to an electronic unit that can instantaneously determine the magnitude of the axial displacement and also its angle, if any, according to FIG. 8.

What is claimed is:

1. A robot arm for industrial robots, comprising one or several jointed arms (1, 1*c*) that are mutually connected to each other by means of rotary joints (1*a*, 1*b*), and a jointed arm (1) connected to a base (3), wherein an angle transducer (4–7) is arranged in the rotary joints (1*a*, 1*b*) in order to measure exactly the angular relationship between the jointed arms (1, 1*c*) or between the jointed arm (1) and the base (3), in order to make possible adjustment of the robot arm into a desired angular position, wherein the angle transducer comprises a first disk, the rotor (4), with circularly arranged and radially directed receiver electrodes (5) and a second disk, the stator (7), equipped with circularly arranged and radially directed transmitter electrodes (6) arranged at the same radius as the receiver electrodes (5) and with a fixed separation between the receiver electrodes and the transmitter electrodes on the two disks, whereby the disks (4, 7) are arranged coaxially and rotatable relative to each other, and the disks are further separated by a thin air-gap that makes possible a capacitive or an inductive coupling between the electrodes (5, 6) on the rotor disk (4) and the stator disk (7), characterised in that the transmitter electrodes (6) are each supplied with an alternating voltage with different phases for neighbouring electrodes, whereby the number of supply phases, $\Phi$, is greater than two, and the separation of transmitter electrodes=the separation of receiver electrodes/$\Phi$, and that the transmitter electrodes (6) of the stator are geometrically arranged such that errors in their geometry relative to the geometry of the receiver electrodes (5) produce equal but opppsite error signals in the receiver electrodes (5) of the rotor.

2. The robot arm according to claim 1, characterised in that n receiver electrodes (5) are evenly distributed over the complete perimeter of the rotor (4), whereby n is an integer, and that n*$\Phi$ transmitter electrodes (6) are evenly distributed over the complete perimeter of the stator (7).

3. The robot arm according to claim 1, characterized in that the rotor disk (4) and the stator disk (7) comprise a second system of electrodes in order to measure directly the angular position of the rotor disk (4) within one complete revolution of 360°.

4. The robot arm according to claim 1, characterized in that it further comprises a special system of electrodes (14–18) to measure the motions of an included mechanical part that arise from play in the system.

5. The robot arm according to claim 4, characterised in that the special system of electrodes comprises electtodes (18;17) integrated in the rotor and stator disks (4;7) that are excited by a transmitter electrode (17) on the stator disk for measurement of movements in the radial direction.

6. The robot arm according to claim 4, characterised in that the special system of electrodes comprises electrodes (15,16;14) integrated in the rotor and stator disks (4;7) that are excited by a transmitter electrode (14) on the stator disk for measurement of movements in the axial direction.

7. The robot arm according to claim 5, characterized in that the transmitter electrode is a common transmitter electrode (19).

8. The robot arm according to claim 2, characterized in that the rotor disk (4) and the stator disk (7) comprise a second system of electrodes in order to measure directly the angular position of the rotor disk (4) within one complete revolution of 360°.

9. The robot arm according to claim 2, characterized in that it further comprises a special system of electrodes (14–18) to measure the motions of an included mechanical part that arise from play in the system.

10. The robot arm according to claim 3, characterized in that it further comprises a special system of electrodes (14–18) to measure the motions of an included mechanical part that arise from play in the system.

11. The robot arm according to claim 6, characterized in that the transmitter electrode is a common transmitter electrode (19).

* * * * *